US012556736B2

(12) United States Patent
Li et al.

(10) Patent No.: US 12,556,736 B2
(45) Date of Patent: Feb. 17, 2026

(54) METHOD AND APPARATUS FOR EXTENDED DECODER SIDE MOTION VECTOR REFINEMENT

(71) Applicant: Tencent America LLC, Palo Alto, CA (US)

(72) Inventors: Guichun Li, San Jose, CA (US); Xin Zhao, Santa Clara, CA (US); Lien-Fei Chen, Hsinchu (TW); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 109 days.

(21) Appl. No.: 18/378,085

(22) Filed: Oct. 9, 2023

(65) Prior Publication Data

US 2024/0137552 A1  Apr. 25, 2024

Related U.S. Application Data

(60) Provisional application No. 63/414,776, filed on Oct. 10, 2022.

(51) Int. Cl.
*H04N 19/513* (2014.01)
*H04N 19/132* (2014.01)
(Continued)

(52) U.S. Cl.
CPC ......... *H04N 19/513* (2014.11); *H04N 19/132* (2014.11); *H04N 19/139* (2014.11);
(Continued)

(58) Field of Classification Search
CPC .. H04N 19/132; H04N 19/139; H04N 19/176; H04N 19/184; H04N 19/186; H04N 19/513; H04N 19/577; H04N 19/70
(Continued)

(56) References Cited

U.S. PATENT DOCUMENTS

2020/0374543 A1* 11/2020 Liu ............... H04N 19/147
2022/0167001 A1*  5/2022 Zhang ........... H04N 19/176

OTHER PUBLICATIONS

Muhammed Coban, et al., Algorithm description of Enhanced Compression Model 5 (ECM 5), Joint Video Experts Team (JVET) of ITU-T SG 16 WP 3 and ISO/IEC JTC 1/SC 29, 26th Meeting, by teleconference, Apr. 20-29, 2022, Document: JVET-Z2025, pp. 1-45.

(Continued)

*Primary Examiner* — Christopher S Kelley
*Assistant Examiner* — Ana Picon-Feliciano
(74) *Attorney, Agent, or Firm* — ArentFox Schiff LLP

(57) ABSTRACT

The processing circuitry receives a coded video bitstream, the coded video bitstream includes coded information of a first block, the coded information indicates a use of a decoder side motion refinement (DMVR) on the first block. The first block has a first sample size. The processing circuitry applies an extended DMVR on the first block, the extended DMVR uses a second sample size for bilateral matching cost calculation, the second sample size is different from the first sample size of the first block. The processing circuitry calculates a plurality of bilateral matching costs respectively associated with a plurality of motion vector adjustments, at least a first bilateral matching cost in the plurality of bilateral matching costs is calculated based on the second sample size that is different from the first sample size of the first block. The processing circuitry determines a first refined motion vector and reconstructs accordingly.

20 Claims, 10 Drawing Sheets

(51) Int. Cl.
   *H04N 19/139*   (2014.01)
   *H04N 19/176*   (2014.01)
   *H04N 19/184*   (2014.01)
   *H04N 19/186*   (2014.01)
   *H04N 19/70*    (2014.01)
(52) U.S. Cl.
   CPC ......... *H04N 19/176* (2014.11); *H04N 19/184* (2014.11); *H04N 19/186* (2014.11); *H04N 19/70* (2014.11)
(58) Field of Classification Search
   USPC .................................................. 375/240.16
   See application file for complete search history.

(56) References Cited

OTHER PUBLICATIONS

Jianle Chen, et al., Algorithm description for Versatile Video Coding and Test Model 10 (VTM 10), Joint Video Experts Team (JVET) of ITU-T SG 16 WP 3 and ISO/IEC JTC 1/SC 29/WG 11, 19th Meeting: by teleconference, Jun. 22-Jul. 1, 2020, Document: JVET-S2002-v1, pp. 1-97.

ITU-T Study Group. "High efficiency video coding, Series H: Audiovisual and multimedia systems: Infrastructure of audiovisual services-coding of moving video." in General Secretariat and Telecom Radiocommunication (ITU-R) Standardization (ITU-T), sec. H 265, Dec. 2016, pp. 1-664.

ITU-T Study Group. "Versatile video coding, Series H: Audiovisual and multimedia systems: Infrastructure of audiovisual services-coding of moving video." in General Secretariat and Telecom Radiocommunication (ITU-R) Standardization (ITU-T), sec. H 266, Aug. 2020, pp. 1-516.

C. Muhammed, et al., Algorithm description of Enhanced Compression Model 6 (ECM 6), Joint Video Experts Team (JVET) of ITU-T SG 16 WP 3 and ISO/IEC JTC 1/SC 29 27th Meeting, by teleconference, Jul. 13-22, 2022, Document: JVET-AA2025, pp. 1-53.

* cited by examiner

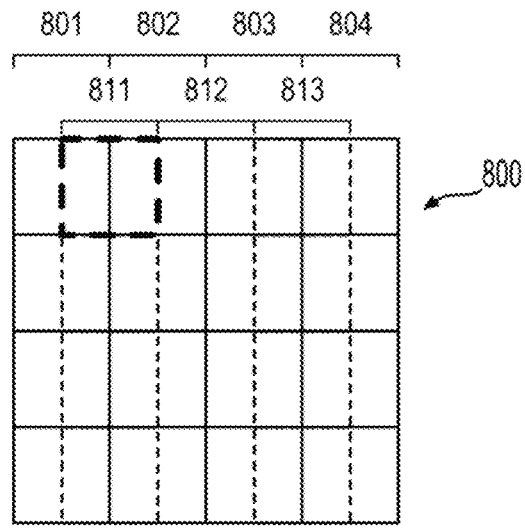
FIG. 8
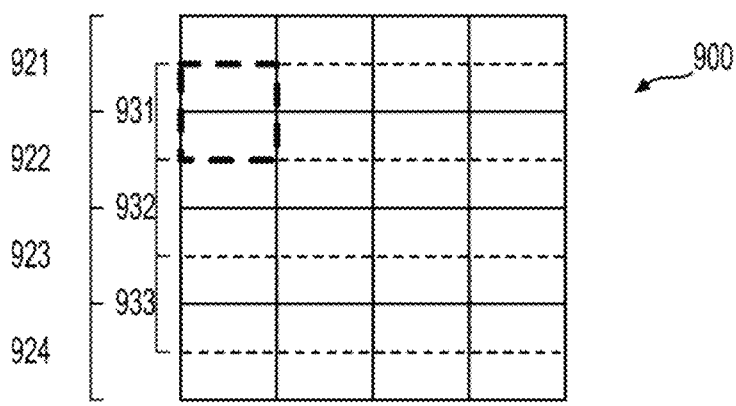
FIG. 9
FIG. 10

METHOD AND APPARATUS FOR EXTENDED DECODER SIDE MOTION VECTOR REFINEMENT

INCORPORATION BY REFERENCE

The present application claims the benefit of priority to U.S. Provisional Application No. 63/414,776, "Method and Apparatus for Extended Decoder Side Motion Vector Refinement" filed on Oct. 10, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives a coded video bitstream, the coded video bitstream includes coded information of a first block, the coded information indicates a use of a decoder side motion refinement (DMVR) on the first block. The first block has a first sample size. The processing circuitry applies an extended DMVR on the first block, the extended DMVR uses a second sample size for bilateral matching cost calculation, the second sample size is different from the first sample size of the first block. The processing circuitry calculates a plurality of bilateral matching costs respectively associated with a plurality of motion vector adjustments, at least a first bilateral matching cost in the plurality of bilateral matching costs is calculated based on the second sample size that is different from the first sample size of the first block. The processing circuitry determines a first refined motion vector for the first block based on the plurality of bilateral matching costs associated with the plurality of motion vector adjustments, and reconstructs the first block having the first sample size based on the first refined motion vector.

According to an aspect of the disclosure, the first sample size is larger than the second sample size.

According to an aspect of the disclosure, the first block is a subblock in a larger block and the first sample size is smaller than the second sample size.

In some examples, the first block has a first width of N luma samples and a first height of M luma samples, the first sample size corresponds to a number of samples in the first block, the second sample size corresponds to a number of samples in a second block with a second width and a second height, the second width is larger than the first width by $2 \times S1$ luma samples, and the second height is larger than the first height by $2 \times S2$ luma samples, and N, M, S1 and S2 are positive integers.

In some examples, the first block has a first width of N luma samples and a first height of M luma samples, the first sample size corresponds to a number of samples in the first block, the second sample size corresponds to a number of samples in a second block with a second width and a second height, the second width is multiple times of the first width, and the second height is multiple times of the first height.

In some examples, the processing circuitry determines, an extended DMVR block with a center aligned with the first block, the extended DMVR block has the second sample size. The processing circuitry determines, according to a first motion vector adjustment and corresponding to the extended DMVR block, a first extended DMVR reference block in a first reference picture and a second extended DMVR reference block in a second reference picture, the first extended DMVR reference block and the second extended DMVR reference block have the second sample size. The processing circuitry calculates the first bilateral matching cost between the first extended DMVR reference block and the second extended DMVR reference block.

In some examples, the processing circuitry determines, according to a first motion vector adjustment and corresponding to the first block, a first DMVR reference block in a first reference picture and a second DMVR reference block in a second reference picture, the first DMVR reference block and the second DMVR reference block have the first sample size. The processing circuitry determines, a first extended DMVR reference block with a center aligned with the first DMVR reference block, the first extended DMVR reference block having the second sample size. The processing circuitry determines, a second extended DMVR reference block with a center aligned with the second DMVR reference block, the second extended DMVR reference block has the second sample size. The processing circuitry calculates the first bilateral matching cost between the first extended DMVR reference block and the second extended DMVR reference block.

In some examples, the processing circuitry determines to apply the extended DMVR in response to the first sample size being smaller than a threshold.

In some examples, the processing circuitry determines that a boundary of the first block is at a boundary of a higher level processing unit, and constrains the boundary from extension for additional samples.

According to another aspect of the disclosure, the processing circuitry determines a second refined motion vector for a second block by an application of the DMVR on the second block, the second block and the first block has an overlapped area. The processing circuitry reconstructs the overlapped area based on the first refined motion vector and the second refined motion vector.

It is noted that a position difference of the first block and the second block is in at least one of a horizontal direction and/or a vertical direction.

In some examples, the processing circuitry selects, from the first refined motion vector and the second refined motion vector, a refined motion vector associated with a lower bilateral matching cost, and reconstructs the overlapped area according to the refined motion vector.

In some examples, the processing circuitry calculates an average motion vector of the first refined motion vector and the second refined motion vector, and reconstructs the overlapped area according to the average motion vector.

In some examples, the processing circuitry calculates a weighted average motion vector of the first refined motion vector and the second refined motion vector, a weight for a refined motion vector is proportional to an inverse of a bilateral matching cost of the refined motion vector. The processing circuitry reconstructs the overlapped area according to the weighted average motion vector.

In some examples, the processing circuitry generates a first prediction sample for a sample in the overlapped area based on the first refined motion vector, generates a second prediction sample for the sample in the overlapped area based on the second refined motion vector, and calculating a weighted average of the first prediction sample and the second prediction sample as a reconstructed sample for the sample in the overlapped area.

In some examples, the processing circuitry decodes a syntax element of at least one of a sequence level, a picture level, a slice level, a tile group level and a tile level, the syntax element has a value indicating a reconstruction of the overlapped area based on the first refined motion vector and the second refined motion vector.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 8 shows a diagram of a block with overlapped subblocks in some examples.

FIG. 9 shows a diagram of a block with overlapped subblocks in some examples.

FIG. 10 shows a diagram of a block with overlapped subblocks in some examples.

DETAILED DESCRIPTION OF EMBODIMENTS

Figure 1:
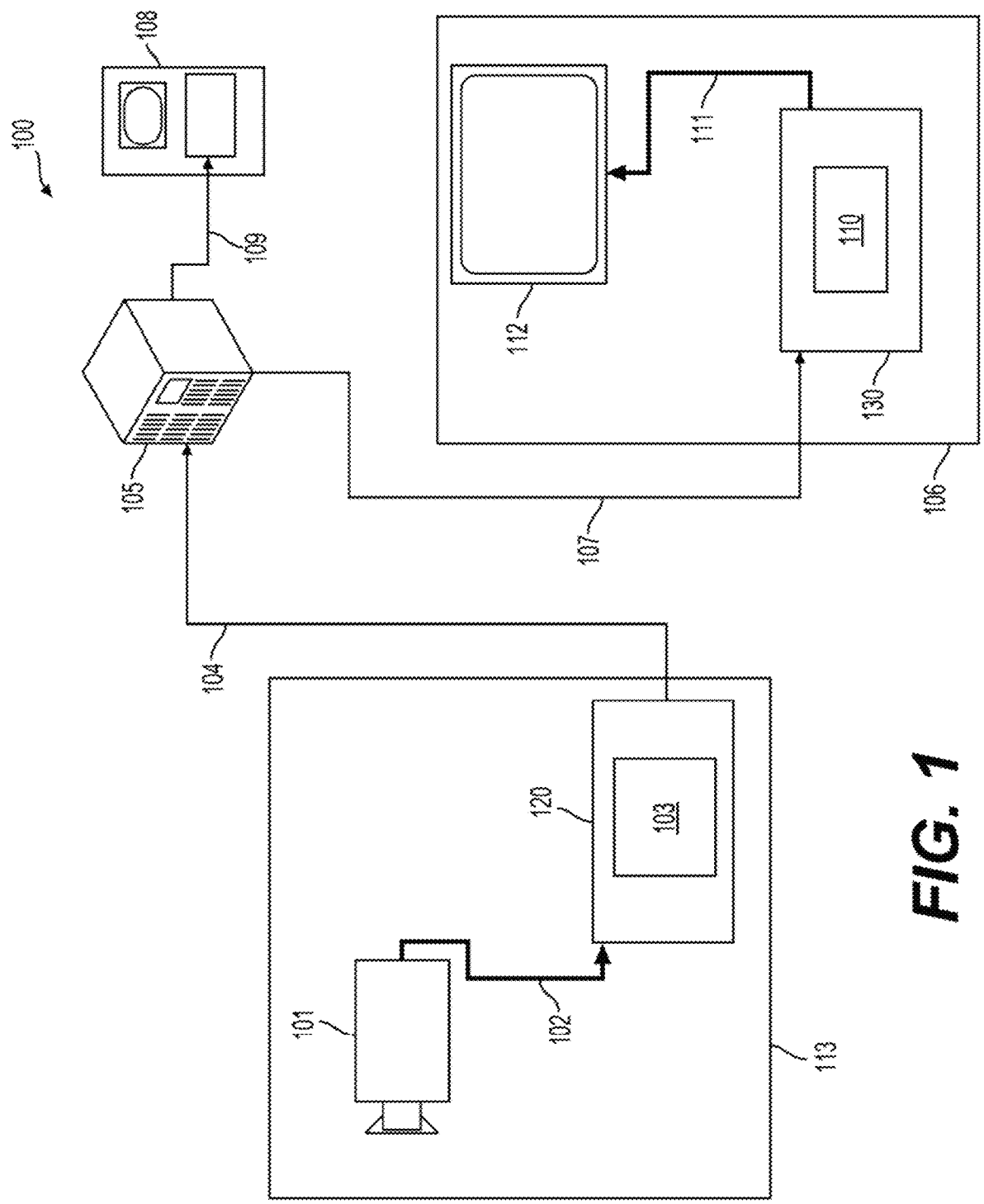
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
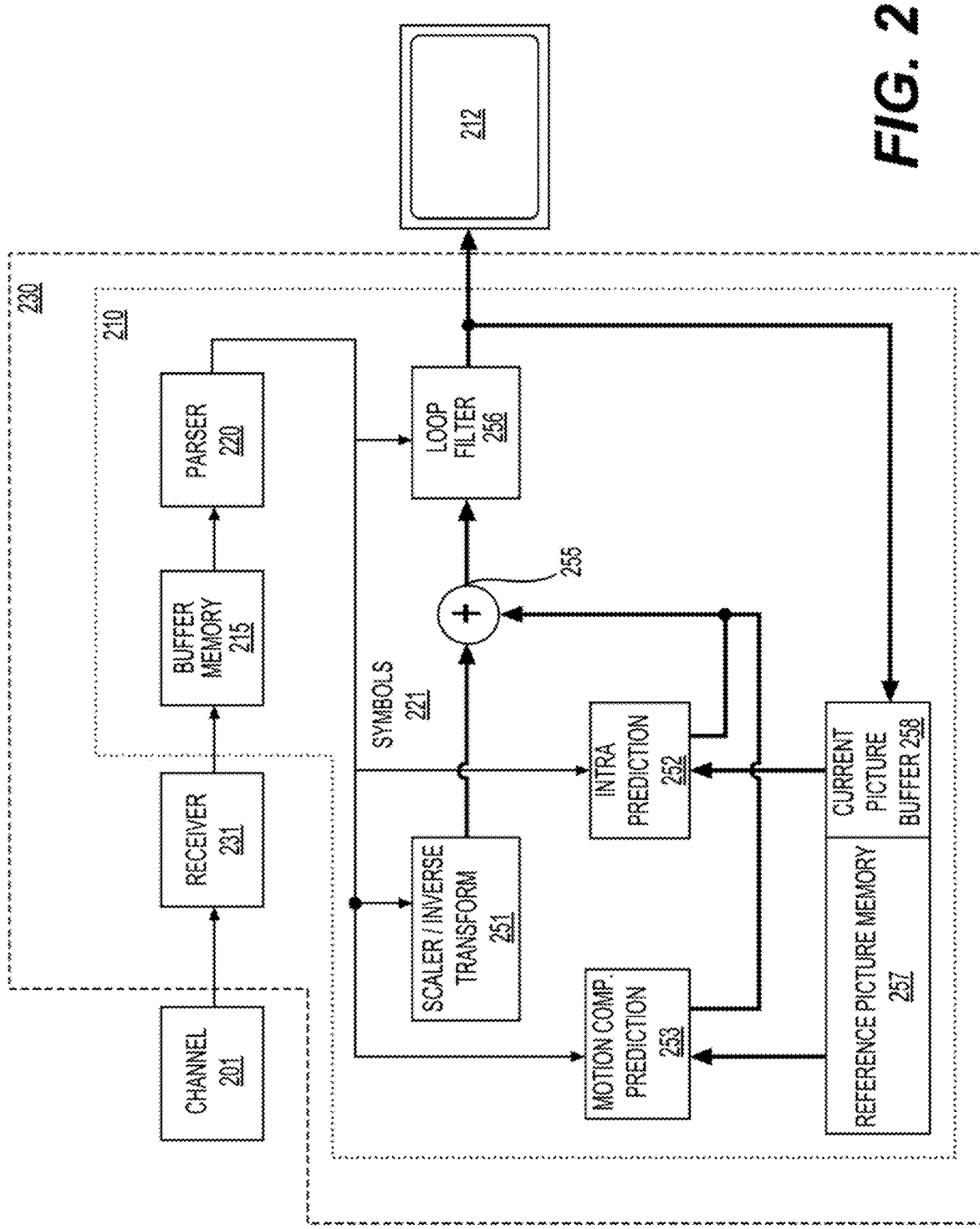
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
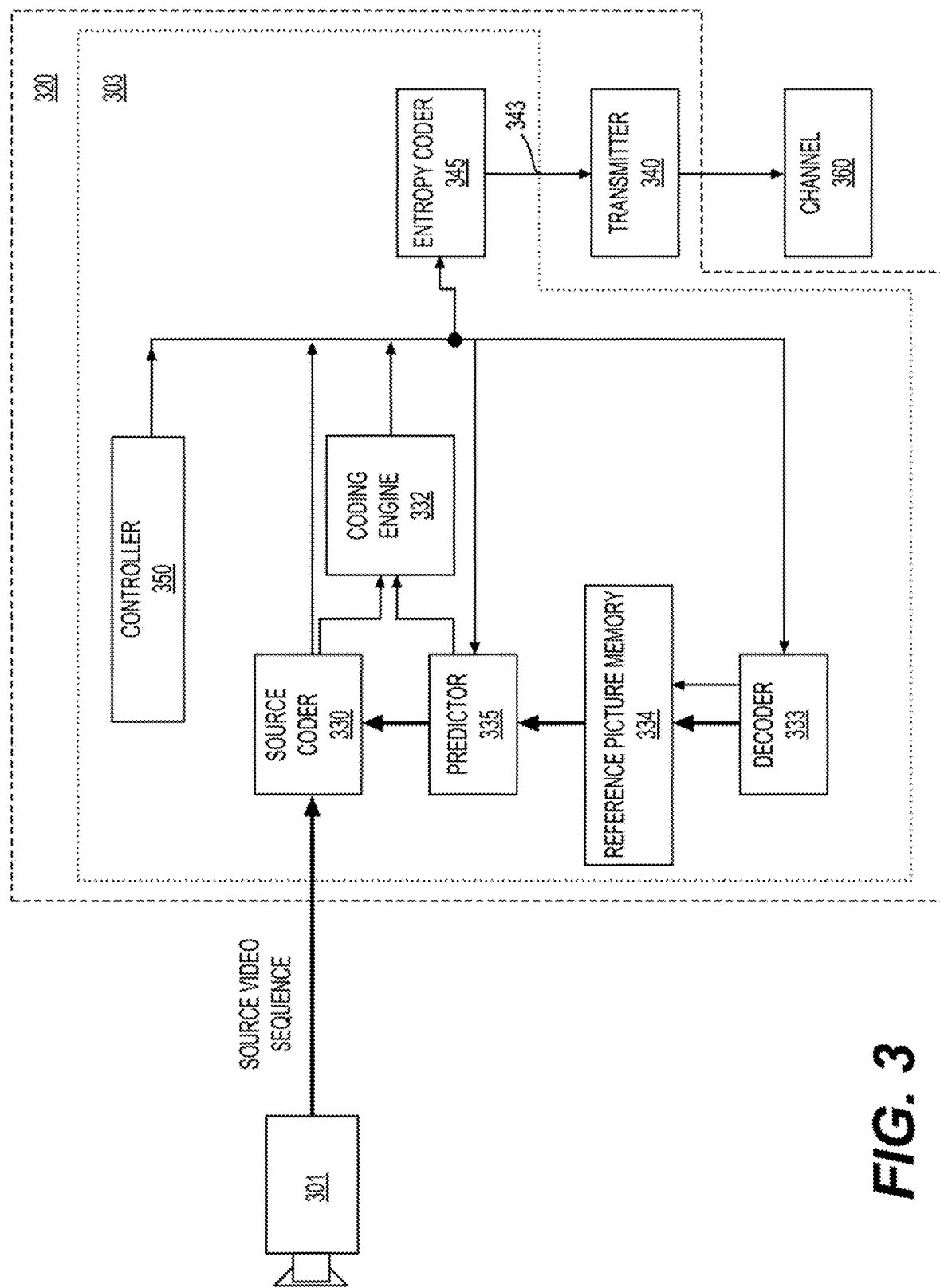
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

In the inter-picture prediction, a merge mode can be used to improve coding efficiency. In the merge mode, the motion vector is derived from neighboring blocks and is directly used for motion compensation. In order to increase the accuracy of the MVs of the merge mode, a bilateral-matching (BM)-based decoder side motion vector refinement can be applied, such as in VVC. In a bi-prediction operation, a refined MV can be searched around initial MVs in a reference picture list L0 and a reference picture list L1. The BM method can calculate a distortion between two candidate blocks in the reference picture list L0 and list L1.

Figure 4:
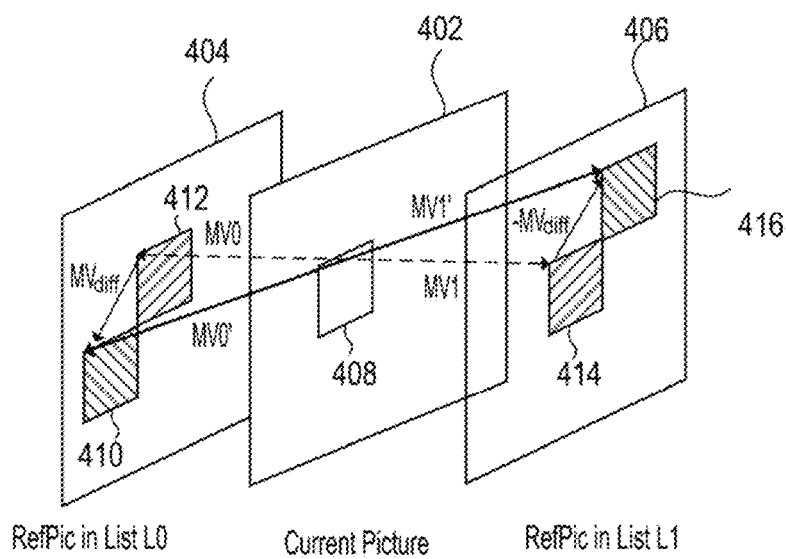
FIG. 4 shows an exemplary schematic view of a bilateral matching based decoder side motion vector refinement in an example.

FIG. 4 shows an exemplary schematic view of a BM-based decoder side motion vector refinement. As show in FIG. 4, a current picture (402) can include a current block (408). The current picture can include a reference picture list L0 (404) and a reference picture list L1 (406). For the current block (408), an initial reference block (412) in the reference picture list L0 (404) can be located according to an initial motion vector MV0 and an initial reference block (414) in the reference picture list L1 (406) can be located according to an initial motion vector MV1. A searching process can be performed around the initial MV0 in the reference picture list L0 (404) and the initial MV1 in the reference picture list L1 (406). For example, a first candidate reference block (410) can be identified in the reference picture list L0 (404) and a first candidate reference block (416) can be identified in the reference picture list L1 (406). A the sum of absolute differences (SAD) between candidate reference blocks (e.g., (410) and (416)) based on each MV candidate (e.g., MV0' and MV1') around the initial MV (e.g., MV0 and MV1) can be calculated. A MV candidate with the lowest SAD can become the refined MV and used to generate a bi-predicted signal to predict the current block (408).

In some examples (e.g., VVC), DMVR is implicitly applied at the block level without the need to signal side information in the bitstream. If a block satisfies certain conditions, the DMVR algorithm is invoked. For example, the conditions (also referred to as requirement for DMVR or a set of conditions for DMVR) can include:

(1) CU level merge mode with bi-prediction MV,
(2) One reference picture is in the past and another reference picture is in the future with respect to the current picture,
(3) The distances (e.g., POC difference) from two reference pictures to the current picture are the same,
(4) Both reference pictures are short-term reference pictures,
(5) CU has more than 64 luma samples,
(6) Both CU height and CU width are larger than or equal to 8 luma samples,
(7) Bi-prediction with CU level weights (BCW) weight index indicates equal weight,
(8) weighted prediction (WP) is not enabled for the current block, and
(9) Combined inter and intra prediction (CIIP) mode is not used for the current block.

It is noted that the refined MV derived by DMVR process is used to generate the inter prediction samples and can be used in temporal motion vector prediction for future pictures coding. In some examples, the original MV is used in a deblocking process and also used in spatial motion vector prediction for future CU coding.

In some examples (e.g., VVC), decoder side motion vector refinement (DMVR) is applied to CU coded in regular merge mode. The pair of MVs obtained from the regular merge candidate is used as input of the DMVR process. DMVR applies the bilateral matching (BM) to refine the input MV pair $\{mv_{L0}, mv_{L1}\}$ and uses the refined MV pair $\{mv_{refinedL0}, mv_{refinedL1}\}$ for the motion compensated prediction of both luma and chroma components as shown in FIG. 4. The output MVs of DMVR can be referred to as refined MV pair, and can be represented by Eq. (1):

$$mv_{refinedL0} = mv_{L0} + \Delta mv$$

$$mv_{refinedL1} = mv_{L1} - \Delta mv \qquad \text{Eq. (1)}$$

The motion vector difference Amy is applied to the input MV pair to obtain the refined MV pair by using the MVD mirroring property, because the input MV pair point to two different reference pictures that have equal difference in picture order count (POC) to the current picture and these two reference pictures are at different temporal direction.

In some examples, in DMVR, a luma coded block is divided into 16×16 subblocks for the MV refinement process. The refinement search range is two integer luma samples from the initial MV. The Amy is derived independently for each subblocks in two steps, such as an integer precision motion search step (also referred to as integer sample offset search) followed by a fractional motion search step (also referred to as fractional sample offset search).

Finally, the subblock motion compensation (MC) is applied using the refined MV pair $\{mv_{refinedL0}, mv_{refinedL1}\}$.

According to an aspect of the disclosure, in the integer precision motion search step of DMVR, the search space includes 25 MV pairs of candidates that can be represented by Eq. (2):

$$mv_{L0(i,j)} = mv_{L0(0,0)} + (i,j)$$

$$mv_{L1(i,j)} = mv_{L1(0,0)} - (i,j) \quad \text{Eq. (2)}$$

where (i, j) represents the coordinate of the search point around the initial MV pair, and i and j are integer value between −2 and 2 inclusive in an example. In some examples, the SAD of the initial MV pair is first calculated and the SAD can be calculated according to Eq. (3):

$$SAD(i,j) = K \sum_{n=0}^{\frac{H}{2}} \sum_{m=0}^{W} diff_{m,n} \quad \text{Eq. (3)}$$

$$diff_{m,n} = abs(P0_{i,j}[m+i, 2n+j] - P1_{i,j}[m-i, 2n-j]) \text{ and}$$

$$K = \begin{cases} 3/4 & i=0, j=0 \\ 1 & \text{otherwise} \end{cases}$$

In Eq. (3), W and H denote the weight and height of the subblock, $P0_{i,j}[m+i, 2n+j]$ and $P1_{i,j}[m-i, 2n-j]$ denote the corresponding samples in the two reference pictures. When the SAD of the initial MV pair is smaller than a threshold, the integer precision motion search step of DMVR is terminated. Otherwise SADs of the remaining 24 points are calculated and checked for example in raster scanning order. The point with the smallest SAD is selected as the output of integer precision motion search step. In some examples, to reduce the penalty of the uncertainty of DMVR refinement, the original MV may be favored during the DMVR process. In an example, the SAD between the reference blocks referred by the initial MV candidates is decreased by ¼ of the SAD value, thus the initial MV candidates can be favored.

In the fractional motion search step (fractional sample offset search) in DMVR, the candidate MV pair selected in the integer precision motion search step (integer sample offset search step) is further refined. In some examples, to save the calculational complexity, the fractional sample refinement is derived by using parametric error surface equation, instead of additional search with SAD comparison. The fractional sample refinement is conditionally invoked based on the output of the integer sample offset search step. When the integer sample offset search step is terminated with center having the smallest SAD in either the first iteration or the second iteration search, the fractional sample refinement is further applied. In parametric error surface based sub-pixel offsets estimation, the center position cost and the costs at four neighboring positions from the center (e.g., in the first step of integer precision motion search) are used to fit a 2-D parabolic error surface equation, such as Eq. (4):

$$E(x,y) = \alpha(x-x_{min})^2 + \beta(y-y_{min})^2 + \gamma \quad \text{Eq. (4)}$$

where ($x_{min}$, $y_{min}$) corresponds to the fractional position with the least cost and γ corresponds to the minimum cost value. Eq. (4) is fitted to 5 of the 25 SAD costs calculated in the first step in order to determine the 5 unknowns parameters, i.e., α, β, γ, $x_{min}$, and $y_{min}$. By solving the Eq. (4) with the use of the cost values of the five search points, the ($x_{min}$, $y_{min}$) is computed, for example according to Eq. (5) and Eq. (6):

$$x_{min} = (E(-1,0) - E(1,0))/(2(E(-1,0) + E(1,0) - 2E(0,0))) \quad \text{Eq. (5)}$$

$$y_{min} = (E(0,-1) - E(0,1))/(2((E(0,-1) + E(0,1) - 2E(0,0))) \quad \text{Eq. (6)}$$

In Eq. (5) and Eq. (6), E(−1,0), E(1,0), E(1,0), E(0, −1) and E(0,0) denote the cost values at the 5 points. The value of $x_{min}$, and $y_{min}$ are automatically constrained to be between −8 and 8 since all cost values are positive and the smallest value is E(0,0). The constraints correspond to half pel offset with 1/16-th-pel MV accuracy in VVC. The computed fractional ($x_{min}$, $y_{min}$) can be added to the integer distance refinement MV to get the sub-pixel accurate refinement delta MV.

Bilinear-interpolation and sample padding can be applied, such as in VVC. A resolution of MVs can be 1/16 luma samples, for example. Samples at a fractional position can be interpolated using an 8-tap interpolation filter. In DMVR, search points can surround an initial fractional-pel MV with an integer sample offset, therefore the samples of the fractional position need to be interpolated for DMVR search process. To reduce the calculation complexity, a bi-linear interpolation filter can be used to generate the fractional samples for the searching process in DMVR. In another important effect, by using the bi-linear filter with a 2-sample search range, the DVMR does not access more reference samples compared to a normal motion compensation process. After the refined MV is attained with a DMVR search process, the normal 8-tap interpolation filter can be applied to generate a final prediction. In order not to access more reference samples compared to a normal MC process, the samples, which may not be needed for the interpolation process based on the original MV but may be needed for the interpolation process based on the refined MV, can be padded from samples that are available.

When a width and/or a height of a CU is larger than 16 luma samples, the CU can be further split into subblocks with a width and/or a height equal to 16 luma samples. A maximum unit size for DMVR searching process can be limit to 16×16.

A technique that is referred to as bi-directional optical flow (BDOF) can be used for example in VVC. BDOF was previously referred to as BIO in the JEM. Compared to the JEM version, the BDOF in VVC can be a simpler version that requires less computation, especially in terms of the number of multiplications and the size of the multiplier.

BDOF can be used to refine a bi-prediction signal of a CU at a 4×4 subblock level. BDOF can be applied to a CU if the CU satisfies conditions (also referred to as requirement for BDOF, or a set of conditions for BDOF) as follows:
  (1) The CU is coded using "true" bi-prediction mode, i.e., one of the two reference pictures is prior to the current picture in display order and the other is after the current picture in display order,
  (2) The distances (e.g., POC difference) from two reference pictures to the current picture are the same,
  (3) Both reference pictures are short-term reference pictures,
  (4) The CU is not coded using affine mode or the SbTMVP merge mode,
  (5) CU has more than 64 luma samples,
  (6) Both CU height and CU width are larger than or equal to 8 luma samples,
  (7) BCW weight index indicates equal weight,
  (8) Weighted prediction (WP) is not enabled for the current CU, and
  (9) CIIP mode is not used for the current CU.

In some examples, BDOF is only applied to a luma component. As the name of BDOF indicates, the BDOF mode can be based on an optical flow concept, which assumes that a motion of an object is smooth. For each 4×4 subblock, a motion refinement ($v_x$, $v_y$) can be calculated by minimizing a difference between L0 and L1 prediction samples. The motion refinement can then be used to adjust the bi-predicted sample values in the 4×4 subblock. BDOF can include steps as follows.

First, horizontal and vertical gradients, $$\frac{\partial I^{(k)}}{\partial x}(i, j) \text{ and } \frac{\partial I^{(k)}}{\partial y}(i, j),$$

k=0,1, of the two prediction signals from the reference list L0 and the reference list L1 can be computed by directly calculating a difference between two neighboring samples. The horizontal and vertical gradients can be provided in Eq. (7) and Eq. (8) as follows:

$$\frac{\partial I^{(k)}}{\partial x}(i, j) = \left( \left( I^{(k)}(i+1, j) \gg \text{shift1} \right) - \left( I^{(k)}(i-1, j) \gg \text{shift1} \right) \right) \quad \text{Eq. (7)}$$

$$\frac{\partial I^{(k)}}{\partial y}(i, j) = \left( \left( I^{(k)}(i, j+1) \gg \text{shift1} \right) - \left( I^{(k)}(i, j-1) \gg \text{shift1} \right) \right) \quad \text{Eq. (8)}$$

where $I^{(k)}(i,j)$ can be a sample value at coordinate (i,j) of the prediction signal in list k, k=0,1, and shift1 can be calculated based on a luma bit depth, bitDepth, as shift1=max(6, bitDepth−6).

Then, an auto- and cross-correlation of the gradients, $S_1$, $S_2$, $S_3$, $S_s$, and $S_6$, can be calculated according to Eqs. (9)-(13) as follows:

$$S_1 = \Sigma_{(i,j) \in \Omega} \text{Abs}(\psi_x(i,j)), \quad \text{Eq. (9)}$$

$$S_2 = \Sigma_{(i,j) \in \Omega}(i,j) \cdot \text{Sign}(\psi_y(i,j)) \quad \text{Eq. (10)}$$

$$S_3 = \Sigma_{(i,j) \Sigma \Omega} \theta(i,j) \cdot \text{Sign}(\psi_x(i,j)) \quad \text{Eq. (11)}$$

$$S_5 = \Sigma_{(i,j) \in \Omega} \text{Abs}(\psi_y(i,j)) \quad \text{Eq. (12)}$$

$$S_6 = \Sigma_{(i,j) \in \Omega} \theta(i,j) \cdot \text{Sign}(\psi_y(i,j)) \quad \text{Eq. (13)}$$

where $\psi_x(i,j)$, $\psi_y(i,j)$, and $\theta(i, j)$ can be provided in Eq. (14)-(16) respectively.

$$\psi_x(i, j) = \left( \frac{\partial I^{(1)}}{\partial x}(i, j) + \frac{\partial I^{(0)}}{\partial x}(i, j) \right) \gg n_a \quad \text{Eq. (14)}$$

$$\psi_y(i, j) = \left( \frac{\partial I^{(1)}}{\partial y}(i, j) + \frac{\partial I^{(0)}}{\partial y}(i, j) \right) \gg n_a \quad \text{Eq. (15)}$$

$$\theta(i, j) = \left( I^{(1)}(i, j) \gg n_b \right) - \left( I^{(0)}(i, j) \gg n_b \right) \quad \text{Eq. (16)}$$

where $\Omega$ can be a 6×6 window around the 4×4 subblock, and the values of $n_a$ and $n_b$ can be set equal to min (1, bitDepth−11) and min (4, bitDepth−8), respectively.

The motion refinement ($v_x$, $v_y$) can then be derived using the cross- and auto-correlation terms using Eqs. (17) and (18) as follows:

$$v_x = S_1 > 0 ? \text{clip3}(-th'_{BIO}, th'_{BIO}, -((S_3 \cdot 2^{n_b-n_a}) \gg \lfloor \log_2 S_1 \rfloor)) : 0 \quad \text{Eq. (17)}$$

$$v_y = S_5 > 0 ? \text{clip3}(-th'_{BIO}, th'_{BIO}, -((S_6 \cdot 2^{n_b-n_a} - ((v_x S_{2,m}) \ll n_{s_2} + v_x S_{2,s})/2) \gg \lfloor \log_2 S_5 \rfloor)) : 0 \quad \text{Eq. (18)}$$

where $$S_{2,m} = S_2 \gg n_{S_2}, \quad S_{2,s} = S_2 \& (2^{n_{S_2}} - 1), \quad th'_{BIO} = 2^{\max(5, BD-7)}.$$

$\lfloor \cdot \rfloor$ is a floor function, and $n_{s_2}$=12. Based on the motion refinement and the gradients, an adjustment can be calculated for each sample in the 4×4 subblock based on Eq. (19):

$$b(x, y) = \qquad \text{Eq. (19)}$$

$$rnd\left( \left( v_x \left( \frac{\partial I^{(1)}(x, y)}{\partial x} - \frac{\partial I^{(0)}(x, y)}{\partial x} \right) + v_y \left( \frac{\partial I^{(1)}(x, y)}{\partial y} - \frac{\partial I^{(0)}(x, y)}{\partial y} \right) + 1 \right) / 2 \right)$$

Finally, the BDOF samples of the CU can be calculated by adjusting the bi-prediction samples in Eq. (20) as follows:

$$\text{pred}_{BDOF}(x,y) = (I^{(0)}(x,y) + I^{(1)}(x,y) + b(x,y) + o_{offset}) \gg \text{shift} \quad \text{Eq. (20)}$$

Values can be selected such that multipliers in the BDOF process do not exceed 15-bits, and a maximum bit-width of the intermediate parameters in the BDOF process can be kept within 32-bits.

Figure 5:
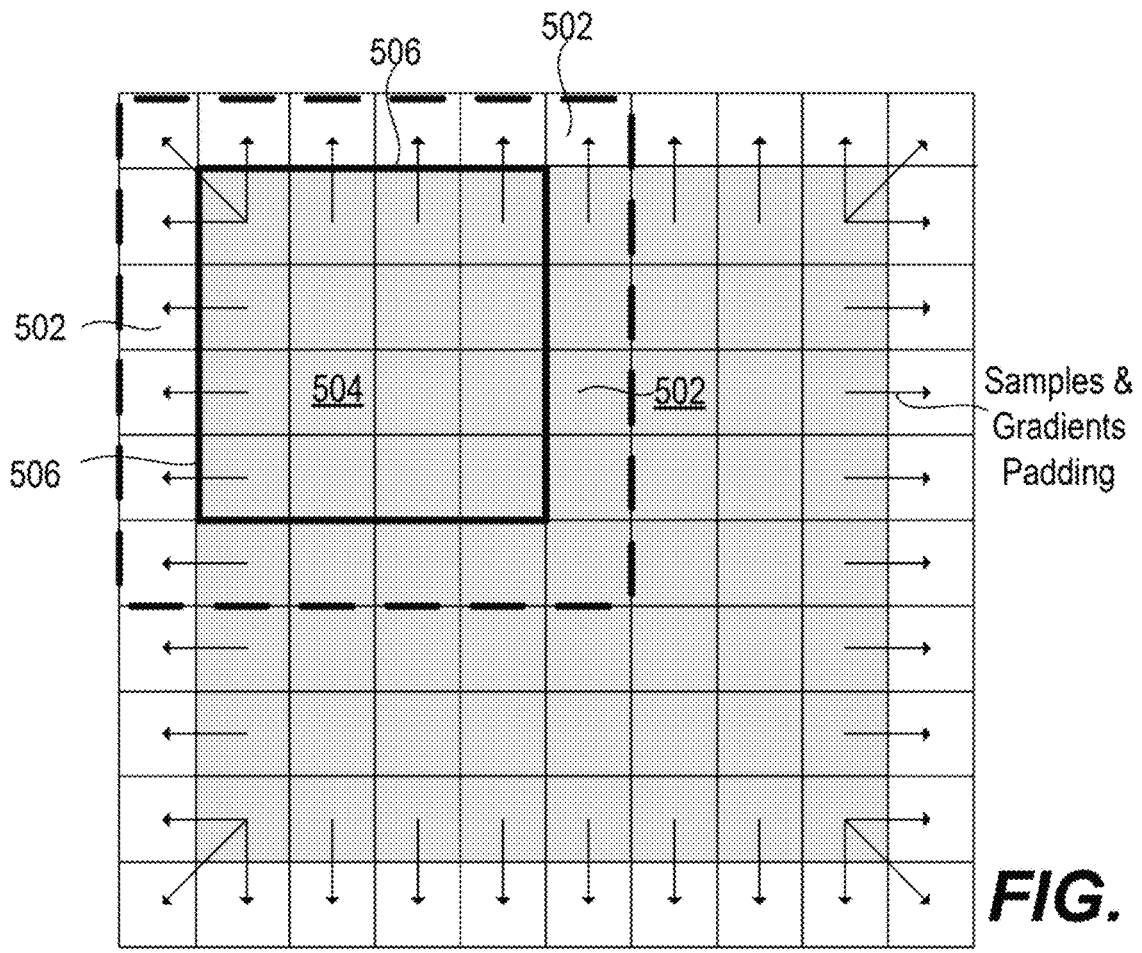
FIG. 5 shows a diagram of extended region of a block in bi-directional optical flow (BDOF) in an example.

In order to derive the gradient values, some prediction samples $I^{(k)}$ (i,j) in the list k (k=0,1) outside of the current CU boundaries need to be generated. As shown in FIG. 5, BDOF in VVC can use one extended row/column (502) around boundaries (506) of a CU (504). In order to control the computational complexity of generating the out-of-boundary prediction samples, prediction samples in an extended area (e.g., unshaded region in FIG. 5) can be generated by taking the reference samples at the nearby integer positions (e.g., using a floor( ) operation on the coordinates) directly without interpolation, and a normal 8-tap motion compensation interpolation filter can be used to generate prediction samples within the CU (e.g., the shaded region in FIG. 5). The extended sample values can be used in gradient calculation only. For the remaining steps in the BDOF process, if any samples and gradient values outside of the CU boundaries are needed, the samples and gradient values can be padded (e.g., repeated) from nearest neighbors of the samples and gradient values.

In some examples, sample based BDOF can be used instead of a block based BDOF. In the sample-based BDOF, instead of deriving motion refinement ($v_x$, $v_y$) on a block basis, it is performed per sample. The coding block is divided into 8×8 subblocks. For each subblock, whether to apply BDOF or not is determined by checking the SAD between the two reference subblocks against a threshold. If decided to apply BDOF to a subblock, for every sample in the subblock, a sliding 5×5 window is used and the existing BDOF process is applied for every sliding window to derive $v_x$ and $v_y$. The derived motion refinement ($v_x$, $v_y$) is applied to adjust the bi-predicted sample value for the center sample of the window.

In some examples, multi-pass DMVR can be used. In an example, in the first pass, bilateral matching (BM) is applied to a coding block. In the second pass, BM is applied to each 16×16 subblock within the coding block. In the third pass, MV in each 8×8 subblock is refined by applying bi-directional optical flow (BDOF). The refined MVs are stored for both spatial and temporal motion vector prediction.

Specifically, the first pass performs block based bilateral matching MV refinement. In the first pass, a refined MV is derived by applying BM to a coding block. Similar to decoder-side motion vector refinement (DMVR), in bi-prediction operation, a refined MV is searched around the two initial MVs (MV0 and MV1) in the reference picture lists L0 and L1. The refined MVs (MV0_pass1 and MV1_pass1) are derived around the initiate MVs based on the minimum bilateral matching cost between the two reference blocks in L0 and L1. The bilateral matching cost can be calculated by any suitable error measuring metric that measures errors between the two reference blocks in L0 and L1. In an example, the bilateral matching cost includes a term that is a sum of absolute differences (SAD) between corresponding samples in the two reference blocks in L0 and L i.

BM can performs local search to derive integer sample precision intDeltaMV. The local search applies a 3×3 square search pattern to loop through the search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated as: bilCost=mvDistanceCost+sadCost. When the block size cbW×cbH is greater than 64, a mean removed SAD (MR-SAD) cost function is applied to remove the DC effect of distortion between reference blocks. When the bilCost at the center point of the 3×3 search pattern has the minimum cost, the intDeltaMV local search is terminated. Otherwise, the current minimum cost search point becomes the new center point of the 3×3 search pattern and continue to search for the minimum cost, until it reaches the end of the search range.

The existing fractional sample refinement is further applied to derive the final deltaMV. The refined MVs after the first pass is then derived as:

$$MV0\_pass1 = MV0 + deltaMV \quad \text{Eq. (21)}$$

$$MV1\_pass1 = MV1 - deltaMV \quad \text{Eq. (22)}$$

In the second pass, subblock based bilateral matching MV refinement is performed. Specifically, in the second pass, a refined MV is derived by applying BM to a 16×16 grid subblock. For each subblock, a refined MV is searched around the two MVs (MV0_pass1 and MV1_pass1), obtained on the first pass, in the reference picture list L0 and L1. The refined MVs (MV0_pass2(sbIdx2) and MV1_pass2 (sbIdx2)) are derived based on the minimum bilateral matching cost between the two reference subblocks in L0 and L1.

For each subblock, BM performs full search to derive integer sample precision intDeltaMV. The full search has a search range [−sHor, sHor] in horizontal direction and [−sVer, sVer] in vertical direction, wherein, the values of sHor and sVer are determined by the block dimension, and the maximum value of sHor and sVer is 8.

The bilateral matching cost is calculated by applying a cost factor to the sum of absolute transformed differences (SATD) cost between two reference subblocks, as: bilCost=satdCost×costFactor. In some examples, the search area (2×sHor+1)×(2×sVer+1) is divided up to 5 diamond shape search regions.

Figure 6:
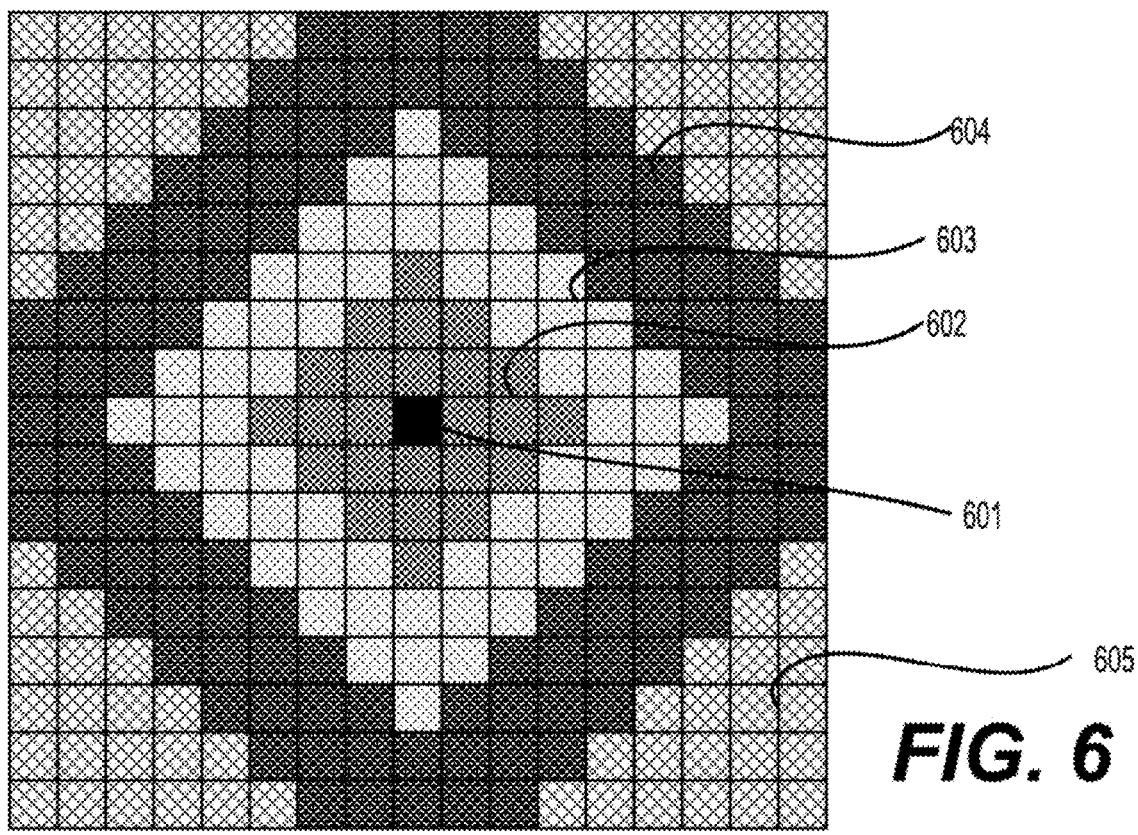
FIG. 6 shows a search area in some examples.

FIG. 6 shows a search area (600) in some examples. The search area (600) is divided to 5 search regions (601)-(605). The shape of the search regions is similar to diamond shape.

In some examples, each search region is assigned a costFactor, which is determined by the distance (intDeltaMV) between each search point and the starting MV, and each diamond region is processed in the order starting from the center of the search area. In each region, the search points are processed in the raster scan order starting from the top left going to the bottom right corner of the region. When the minimum bilCost within the current search region is less than a threshold equal to sbW×sbH, the int-pel full search is terminated, otherwise, the int-pel full search continues to the next search region until all search points are examined. Additionally, if the difference between the previous minimum cost and the current minimum cost in the iteration is less than a threshold that is equal to the area of the block, the search process terminates.

In some examples, the fractional sample refinement, such as the DMVR fractional sample refinement in VVC, is further applied to derive the final deltaMV(sbIdx2). The refined MVs at second pass is then derived as:

$$MV0\_pass2(sbIdx2) = MV0\_pass1 + deltaMV(sbIdx2) \quad \text{Eq. (23)}$$

$$MV1\_pass2(sbIdx2) = MV1\_pass1 - deltaMV(sbIdx2) \quad \text{Eq. (24)}$$

In the third pass, subblock based bi-directional optical flow MV refinement can be performed. Specifically, in the third pass, a refined MV is derived by applying BDOF to an 8×8 grid subblock. For each 8×8 subblock, BDOF refinement is applied to derive scaled Vx and Vy without clipping starting from the refined MV of the parent subblock of the second pass. The derived bioMv(Vx, Vy) is rounded to 1/16 sample precision and clipped between −32 and 32. The refined MVs (MV0_pass3(sbIdx3) and MV1_pass3 (sbIdx3)) at third pass are derived as:

$$MV0\_pass3(sbIdx3) = MV0\_pass2(sbIdx2) + bioMv \quad \text{Eq. (25)}$$

$$MV1\_pass3(sbIdx3) = MV0\_pass2(sbIdx2) - bioMv \quad \text{Eq. (26)}$$

In some examples, affine merge with DMVR on translational model can be performed. In an example, refinement of the base MV (translational part of the affine model) of the affine model of the coding block coded with the affine merge mode can be performed by applying first step of multi-pass DMVR. For example, adding a translation MV offset to all the CPMVs of the candidate in the affine merge list when the candidate meets the DMVR condition. The MV offset is derived by minimizing the cost of bilateral matching, such as in DMVR. It is noted that the DMVR condition is not changed.

It is noted that the MV offset searching process can be the same as the first pass of multi-pass DMVR in some examples, such as in ECM. Specifically, 3×3 square search pattern is used to loop through the search range [−8, +8] in horizontal direction and [−8, +8] in vertical direction to find the best integer MV offset. And then half pel search is conducted around the best integer position and an error surface estimation is performed to find a MV offset with 1/16 precision. The refine CPMV is stored for both spatial and temporal motion vector prediction as the multi-pass DMVR in ECM.

According to an aspect of the disclosure, the existing DMVR refinement process for a subblock is based on the bilateral matching (BM) cost of the same subblock size. When the granularity of the refined MV becomes finer (smaller subblock size), the bilateral matching cost at subblock level may become less accurate due to the reduced number of pixels.

Aspects of the disclosure provide techniques that can improve coding gain of DMVR. In some examples, some techniques are used to extend sample area for BM cost calculation beyond the subblock size, and can increase cost calculation accuracy. In some examples, some techniques are used to perform DMVR refinement in an overlapped manner.

According to an aspect of the disclosure, extended samples are used for bilateral cost calculation in DMVR process. In some examples, encoder/decoder can determine to apply an extended DMVR on a current block having a first sample size. The extended DMVR uses a second sample size for bilateral matching cost calculation, the second sample size is different from the first sample size of the current block. The first sample size is the number of samples in the current block. The second sample size is the number of samples in each of extended reference blocks that are used for the bilateral matching cost calculation. Further, a plurality of bilateral matching costs respectively associated with a plurality of motion vector adjustments are calculated. At least a first bilateral matching cost in the plurality of bilateral matching costs is calculated based on the second sample size that is different from the first sample size of the current block. For example, the first bilateral matching cost is calculated as SAD between two extended reference blocks, the two extended reference blocks respectively have the second sample size. A first refined motion vector for the current block is determined based on the plurality of bilateral matching costs associated with the plurality of motion vector adjustments. For example, a motion vector adjustment with a lowest bilateral matching cost is selected. The first refinement motion vector is calculated as a combination of an initial motion vector (e.g., from a merge list), and the selected motion vector adjustment. The current block having the first sample size is reconstructed based on the first refined motion vector. For example, the current block is predicted based on one or more reference blocks indicated by the first refined motion vector. The one or more reference blocks have the same number of samples as the current block.

In some embodiments, when refining the MV for a current block or subblock with size of N×M (N is the width in luma samples, M is the height in luma samples, and M are integer values in luma samples), the bilateral matching cost is calculated with additional or less number of samples (e.g. S1 samples in each side of the width, and S2 samples in each side of the height) extended from each boundary of the block/subblock outwards, such as making the size for cost calculation (N+2S1)×(M+2S2) when additional samples are used or (N−2S1)×(M−2S2) when less samples are used. The refined MV is still applied for the block with size of N×M.

In some examples, the DMVR subblock size for MV refinement is 4×4 luma samples, and the bilateral matching cost is calculated based on samples in a 8×8 block (extended by 2 samples on each side). The center position of the 8×8 block is suitably aligned with the DMVR subblock. In some examples, the center location of the DMVR block/subblock to get refined MV and the center location of the block for cost calculation are aligned.

Figure 7:
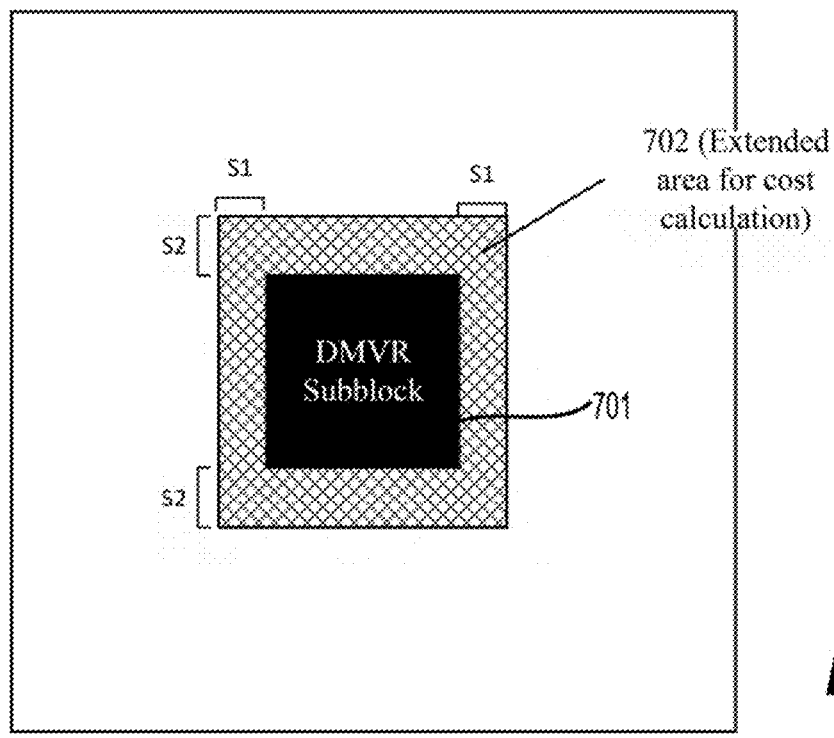
FIG. 7 shows a diagram of subblock for decoder side motion vector refinement in an example.

FIG. 7 shows a diagram of subblock (701) for DMVR refinement in an example. In the FIG. 7 example, a larger block (702) is formed by extensions from each boundary of the subblock (701). For example, from each boundary in the width direction of the subblock (701), S1 samples are extended; and from each boundary of height direction of the subblock (701), S2 samples are extended. The larger block (702) is referred to as extended DMVR block in some examples.

In some embodiments, when refining the MV for a current block or subblock with size of N×M (N is the width in luma samples, M is the height in luma samples, and M are integer values in luma samples), the bilateral matching cost may be calculated with the samples of the block extended to multiple (e.g. 2 times) of the original size, such as making the size of a block for bilateral matching cost calculation to be 2N×2M. The refined MV is still applied for the block with size of N×M.

In some examples, the DMVR subblock size for MV refinement is 8×8 luma samples, and the bilateral matching cost is calculated based on samples in a 16×16 block (extended by a factor of 2 both horizontally and vertically). The center position of the 16×16 block is suitably aligned with the DMVR subblock. In some examples, the center location of the DMVR block/subblock to get refined MV and the center location of the extended block for bilateral cost calculation are aligned.

In some embodiments, when a boundary of the block/subblock for refinement is at the boundary of a higher level processing unit, such as picture/slice/tile/tile group, the boundary at this side is not extended for bilateral matching cost calculation.

In some embodiments, the extended samples for bilateral matching cost calculation are applied only for certain block sizes but not all block sizes. For example, when a block size of a block is smaller than a threshold, the extended samples for bilateral matching cost calculation can be applied on the block. When a block size of a block is equal to or larger than a threshold, the extended samples for bilateral matching cost calculation are not applied on the block. In some embodiments, the extended samples for bilateral matching cost calculation may be applied only for certain DMVR subblock sizes but not all subblock sizes. For example, when a block size of a subblock is smaller than a threshold, the extended samples for bilateral matching cost calculation can be applied on the subblock. When a block size of a subblock is equal to or larger than a threshold, the extended samples for bilateral matching cost calculation are not applied on the subblock.

It is noted that, generally, DMVR process can be performed on nonoverlapping subblocks in a block. According to an aspect of the disclosure, a DMVR process can be performed on two or more subblocks that are overlapped. When a DMVR process is applied on overlapped subblocks, the DMVR process can be referred to as overlapped DMVR refinement process. In some examples, encoder/decoder can determine a first refined motion vector a first block by an application of a DMVR process on the first block, and determine a second refined motion vector for a second block by an application of the DMVR process on the second block. The second block and the first block have an overlapped area. The encoder/decoder can reconstruct the overlapped area based on the first refined motion vector and the second refined motion vector.

In some embodiments, for a DMVR process on subblocks of subblock size of N×M in a block, the subblocks to be refined can be overlapped. The subblocks with DMVR process applied can be referred to as DMVR subblocks.

In some examples, subblocks of size N×M can be arranged every N/2 samples horizontally.

FIG. 8 shows a diagram of a block (800) in some examples. The subblocks of size N×M are arranged in the block (800). For subblocks to apply DMVR process, the subblocks are arranged in the horizontal direction by every N/2 samples. For example, the subblocks by columns are arranged from left to right, as column (801), column (811), column (802), column (812), column (803), column (813), and column (804). Columns (801)-(804) of subblocks are non overlapping and are shown as solid grids. Columns (811)-(813) of subblocks are non overlapping and are shown by dashed grids. The column (811) overlaps with the column (801), and the column (802). The column (812) overlaps with the column (802) and the column (803). The column (813) overlaps with the column (804) and the column (804).

In some examples, subblocks of size N×M can be arranged every M/2 samples vertically.

FIG. 9 shows a diagram of a block (900) in some examples. The subblocks of size N×M are arranged in the block (900). For subblocks to apply DMVR process, the subblocks are arranged in the vertical direction by every M/2 samples. For example, the subblocks by rows are arranged from top to bottom, as row (921), row (931), row (922), row (932), row (923), row (933), and row (924). Rows (921)-(924) of subblocks are non overlapping and are shown as solid grids. Rows (931)-(933) of subblocks are non overlapping and are shown by dashed grids. The row (931) overlaps with the row (921), and the row (922). The row (932) overlaps with the row (922) and the row (923). The row (933) overlaps with the row (924) and the row (924).

In some examples, subblocks of size N×M can be arranged with both horizontal and vertical directions with position difference, such as every N/2 samples horizontally and every M/2 samples vertically.

FIG. 10 shows a diagram of a block (1000) in some examples. The subblocks of size N×M are arranged in the block (1000). For subblocks to apply DMVR process, the subblocks are arranged with overlapped subblocks in the horizontal direction by every N/2 samples and in the vertical direction by every M/2 samples. For example, subblocks (1001)-(1016) are non overlapping and are shown as solid grids. Subblocks (1021)-(1029) are non overlapping and are shown by dashed grids. Each of the subblocks (1021)-(1029) overlaps with four subblocks in the subblocks (1001)-(1016).

In some examples, both horizontal and vertical directions may have overlapped DMVR subblocks, e.g., every N/2 samples horizontally and every M/2 samples vertically. For example, the overlapping patterns in FIG. 8, FIG. 9 and FIG. 10 can be applied.

Figure 11:
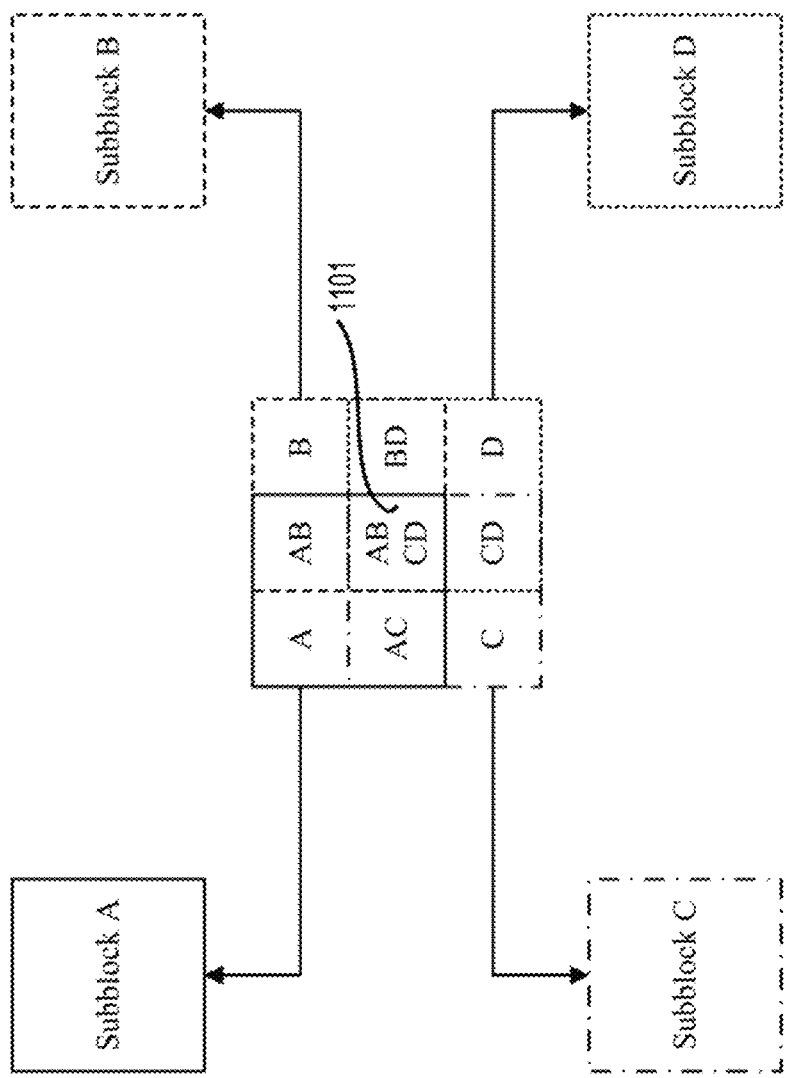
FIG. 11 shows a diagram of a block with overlapped subblocks in some examples.
Figure 11:
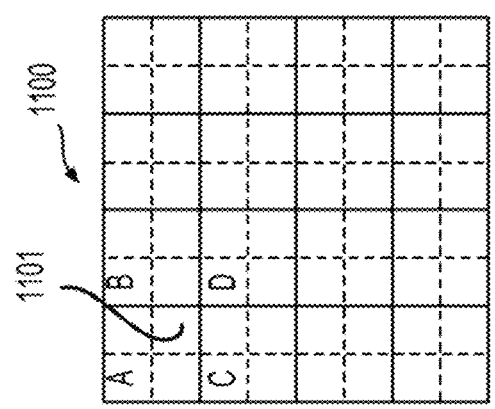

FIG. 11 shows a diagram of a block (1100) with overlapped subblocks in some examples. The overlapping patterns in FIG. 8, FIG. 9 and FIG. 10 are applied.

In some embodiments, each overlapped area may have refined delta MV values derived from all the overlapping DMVR subblocks following a predefined rule.

In the FIG. 11 examples, subblock A, B, C, D are overlapped. Specifically, the subblock B is located at N/2 samples horizontally from the subblock A, the subblock C is located at M/2 samples vertically from the subblock A, and the subblock D is located at N/2 samples horizontally and M/2 samples vertically from the subblock A. In FIG. 11, each overlapped area is marked with the overlapping block names. When an area is only marked with one name, the area is nonoverlapped area. For example, each subblock has a size of 8×8 luma samples, then nonoverlapped area with only the subblock A has a size of 4×4 luma samples; the overlapped aera with all of the subblocks A, B, C and D has a size of 4×4 luma samples.

In some embodiments, for an overlapped area, the delta MV of DMVR refinement is determined from one of the overlapping blocks, based on the lowest bilateral matching cost among all overlapping blocks. For example, the overlapped area (1101) is the overlapped area of all of the subblocks A, B, C and D. When the DMVR refinement is applied on the subblock A, the result is a first delta MV. The first delta MV for the subblock A can achieve a first bilateral matching cost associated with the first delta MV. When the DMVR refinement is applied on the subblock B, the result is a second delta MV. The second delta MV for the subblock B can achieve a second bilateral matching cost associated with the second delta MV. When the DMVR refinement is applied on the subblock C, the result is a third delta MV. The third delta MV for the subblock C can achieve a third bilateral matching cost associated with the third delta MV. When the DMVR refinement is applied on the subblock D, the result is a fourth delta MV. The fourth delta MV for the subblock D can achieve a fourth bilateral matching cost associated with the fourth delta MV. The delta MV of DMVR refinement for the overlapped aera (1101) is selected as one of the first delta MV, the second delta MV, the third delta MV and the fourth delta MV that has the lowest bilateral matching cost.

In some embodiments, for an overlapped area, the delta MV of DMVR refinement is calculated by an average of the delta MVs of the overlapping blocks. For example, the delta MV of DMVR refinement for the overlapped aera (1101) is an average of the first delta MV, the second delta MV, the third delta MV and the fourth delta MV.

In some embodiments, for an overlapped area, the delta MV of DMVR refinement is calculated by weighted average of the delta MVs of the overlapping blocks. For example, the delta MV of DMVR refinement for the overlapped aera (1101) is a weighted average of the first delta MV, the second delta MV, the third delta MV and the fourth delta MV.

In some examples, the weight of each overlapping block may be calculated from the bilateral matching cost of the overlapping block. In an example, the weight is proportional to the inverse of the bilateral matching cost of the overlapping block. For example, to calculate the delta MV of DMVR refinement for the overlapped aera (1101), a first weight for the first delta MV is the inverse of the first bilateral matching cost, a second weight for the second delta MV is the inverse of the second bilateral matching cost, a third weight for the third delta MV is the inverse of the third bilateral matching cost and a fourth weight for the fourth delta MV is the inverse of the fourth bilateral matching cost.

In some embodiments, for an overlapped area, the prediction sample is derived by the weighted average of multiple prediction samples, each calculated using the MVs derived from DMVR applied on the overlapping blocks. In an example, to derive a prediction sample at a location in the overlapped area (1101), a first prediction for the location is determined based on the first delta MV, a second prediction for the location is determined based on the second delta MV, a third prediction for the location is determined based on the third delta MV, and a fourth prediction for the location is determined based on the fourth delta MV. The prediction sample at the location is calculated as a weighted average of the first prediction, the second prediction, the third prediction and the fourth prediction.

In some embodiments, a high level syntax is signaled to indicate which of the method of the refinement delta MV derivation as described above is used. The high level syntax may be signaled at sequence level, picture level, or slice/tile/tile-group level.

Figure 12:
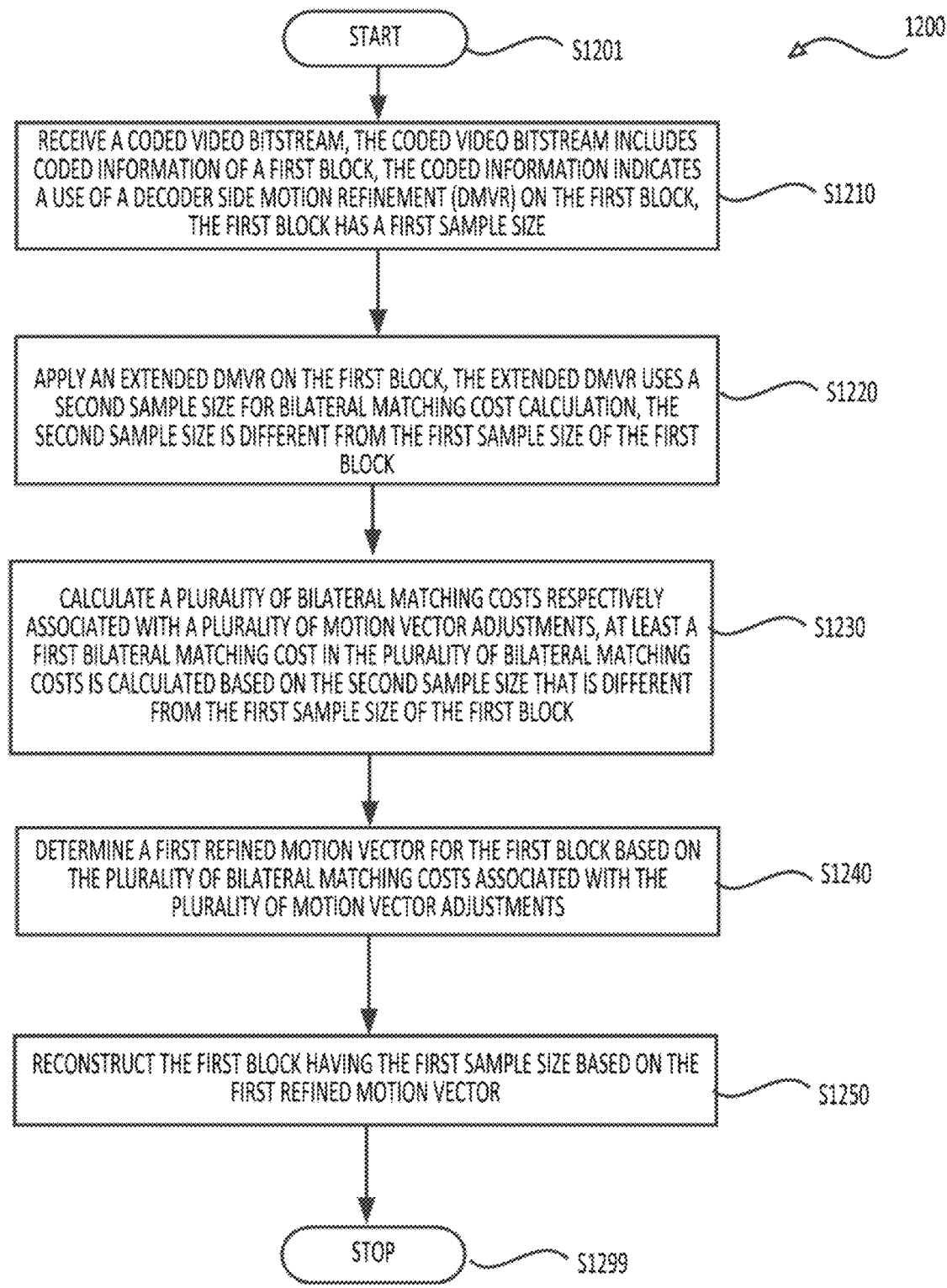
FIG. 12 shows a flow chart outlining another process according to some embodiment of the disclosure.

FIG. 12 shows a flow chart outlining a process (1200) according to an embodiment of the disclosure. The process (1200) can be used in a video decoder. In various embodiments, the process (1200) is executed by processing circuitry, such as the processing circuitry that performs functions of the video decoder (110), the processing circuitry that performs functions of the video decoder (210), and the like. In some embodiments, the process (1200) is implemented in software instructions, thus when the processing circuitry executes the software instructions, the processing circuitry performs the process (1200). The process starts at (S1201) and proceeds to (S1210).

At (S1210), a coded video bitstream is received. The coded video bitstream includes coded information of a first block. The coded information indicates a use of a decoder side motion refinement (DMVR) on the first block. The first block has a first sample size.

At (S1220), an extended DMVR is applied on the first block. The extended DMVR uses a second sample size for bilateral matching cost calculation, the second sample size is different from the first sample size of the first block. The first sample size is the number of samples in the first block. The second sample size is the number of samples in each of extended reference blocks that are used for the bilateral matching cost calculation.

At (S1230), a plurality of bilateral matching costs respectively associated with a plurality of motion vector adjustments are calculated. At least a first bilateral matching cost in the plurality of bilateral matching costs is calculated based on the second sample size that is different from the first sample size of the first block. For example, the first bilateral matching cost is calculated as SAD between two extended reference blocks, the two extended reference blocks respectively have the second sample size.

At (S1240), a first refined motion vector for the first block is determined based on the plurality of bilateral matching costs associated with the plurality of motion vector adjustments. For example, a motion vector adjustment with a lowest bilateral matching cost is selected. The first refinement motion vector is calculated as a combination of an initial motion vector (e.g., from a merge list), and the selected motion vector adjustment.

At (S1250), the first block having the first sample size is reconstructed based on the first refined motion vector. For example, the first block is predicted based on one or more reference blocks indicated by the first refined motion vector. The one or more reference blocks have the same number of samples as the first block.

According to an aspect of the disclosure, the first sample size is larger than the second sample size. For example, when the first sample size is larger than a threshold, smaller sample size can be used in the bilateral matching cost calculation to reduce computation complexity.

According to another aspect of the disclosure, the first block is a subblock in a larger block and the first sample size is smaller than the second sample size. For example, when the first block is a subblock, and then larger sample size can be used in the bilateral matching cost calculation to increase cost calculation accuracy.

In some examples, the first block has a first width of N luma samples and a first height of M luma samples, the first sample size corresponds to a number of luma samples in the first block, the second sample size corresponds to a number of luma samples in a second block with a second width and a second height, the second width is larger than the first width by 2×S1 luma samples, and the second height is larger than the first height by 2×S2 luma samples, and N, M, S1 and S2 are positive integers.

In some examples, the first block has a first width of N luma samples and a first height of M luma samples, the first sample size corresponds to a number of luma samples in the first block, the second sample size corresponds to a number of luma samples in a second block with a second width and a second height, the second width is multiple times of the first width, and the second height is multiple times of the first height.

In some examples, to calculate the plurality of bilateral matching costs respectively associated with the plurality of motion vector adjustments, an extended DMVR block with a center aligned with the first block is determined. The extended DMVR block has the second sample size. According to a first motion vector adjustment and corresponding to the extended DMVR block, a first extended DMVR reference block in a first reference picture and a second extended DMVR reference block in a second reference picture are determined. The first extended DMVR reference block and the second extended DMVR reference block have the second sample size. The first bilateral matching cost, such as SAD, between the first extended DMVR reference block and the second extended DMVR reference block is calculated.

In some examples, to calculate the plurality of bilateral matching costs respectively associated with the plurality of motion vector adjustments, according to a first motion vector adjustment and corresponding to the first block, a first DMVR reference block in a first reference picture and a second DMVR reference block in a second reference picture are determined. The first DMVR reference block and the second DMVR reference block have the first sample size. Then, a first extended DMVR reference block with a center aligned with the first DMVR reference block is determined, the first extended DMVR reference block has the second sample size. Further, a second extended DMVR reference block with a center aligned with the second DMVR reference block is determined. The second extended DMVR reference block has the second sample size. The first bilateral matching cost, such as SAD, between the first extended DMVR reference block and the second extended DMVR reference block is calculated.

According to an aspect of the disclosure, overlapped DMVR process may be applied. In some examples, a second refined motion vector for a second block is determined by an application of the DMVR on the second block. The second block and the first block have an overlapped area. The overlapped area is reconstructed based on the first refined motion vector and the second refined motion vector.

It is noted that a position difference of the first block and the second block is in at least one of a horizontal direction and/or a vertical direction. In an example, the first block and the second block have position difference (e.g., position shift) in the horizontal direction, and overlap horizontally. In another example, the first block and the second block have position difference (e.g., position shift) in vertical direction, and overlap vertically. In another example, the first block and the second block have position difference (e.g., position shift) in both horizontal direction and vertical direction, and overlap horizontally and vertically.

To reconstruct the overlapped area, in some examples, from the first refined motion vector and the second refined motion vector, a refined motion vector associated with a lower bilateral matching cost is selected. The overlapped area is reconstructed according to the refined motion vector.

To reconstruct the overlapped area, in some examples, an average motion vector of the first refined motion vector and the second refined motion vector is calculated. The overlapped area is reconstructed according to the average motion vector.

To reconstruct the overlapped area, in some examples, a weighted average motion vector of the first refined motion vector and the second refined motion vector is calculated. A weight for a refined motion vector is proportional to an inverse of a bilateral matching cost of the refined motion vector. The overlapped area is reconstructed according to the weighted average motion vector.

To reconstruct the overlapped area, in some examples, a first prediction sample for a sample in the overlapped area is generated based on the first refined motion vector, and a second prediction sample for the sample in the overlapped area is generated based on the second refined motion vector. A weighted average of the first prediction sample and the second prediction sample is calculated as a reconstructed sample for the sample in the overlapped area.

In some examples, a syntax element of at least one of a sequence level, a picture level, a slice level, a tile group level and a tile level is decoded, the syntax element has a value that indicates which reconstruction method is used for the overlapped area.

Then, the process proceeds to (S1299) and terminates.

The process (1200) can be suitably adapted. Step(s) in the process (1200) can be modified and/or omitted. Additional step(s) can be added. Any suitable order of implementation can be used.

Figure 13:
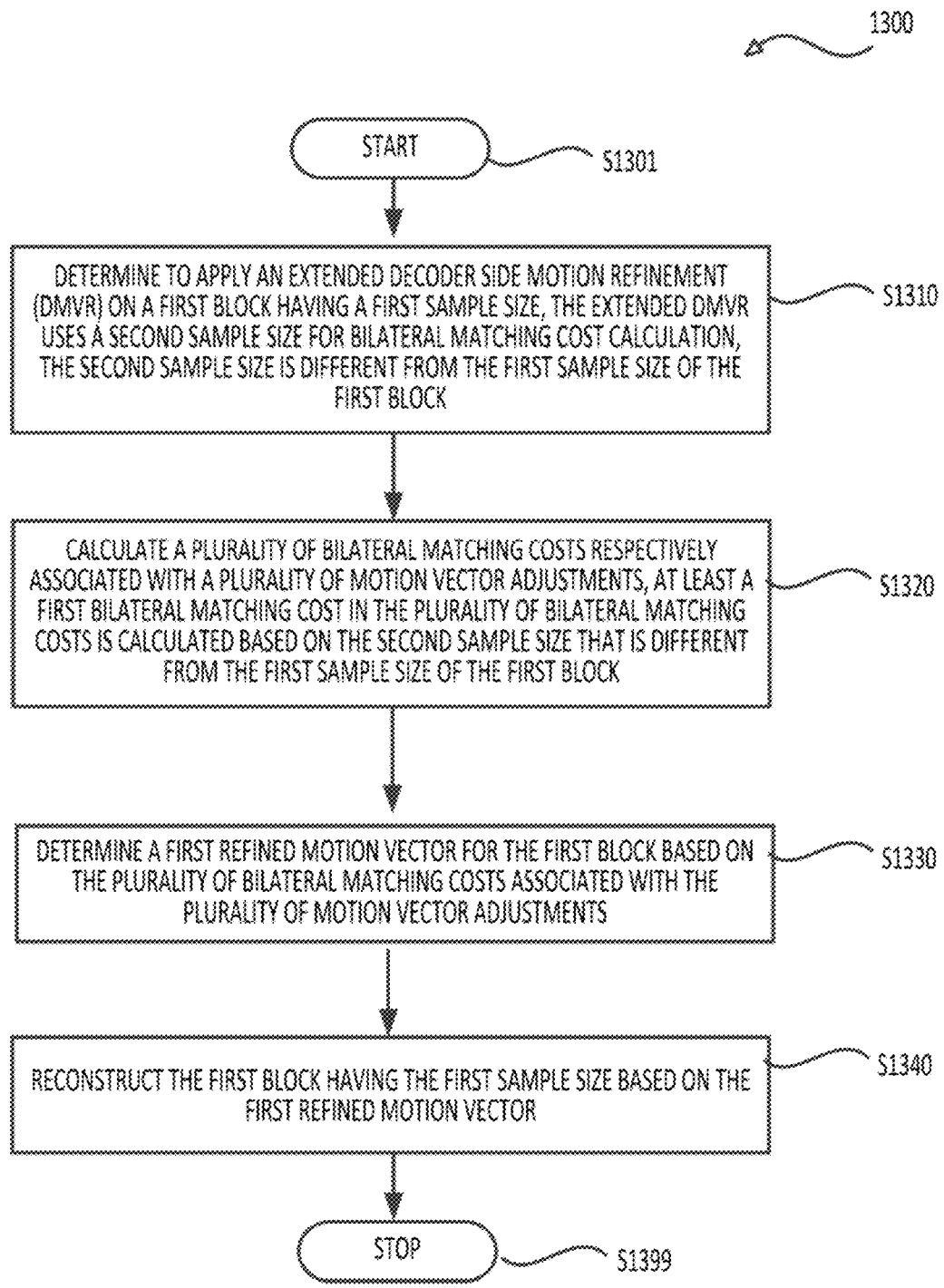
FIG. 13 shows a flow chart outlining a process according to some embodiment of the disclosure.

FIG. 13 shows a flow chart outlining a process (1300) according to an embodiment of the disclosure. The process (1300) can be used in a video encoder. In various embodiments, the process (1300) is executed by processing circuitry, such as the processing circuitry that performs functions of the video encoder (103), the processing circuitry that performs functions of the video encoder (303), and the like. In some embodiments, the process (1300) is implemented in software instructions, thus when the processing circuitry executes the software instructions, the processing circuitry performs the process (1300). The process starts at (S1301) and proceeds to (S1310).

At (S1310), to apply an extended decoder side motion refinement (DMVR) on a first block having a first sample size is determined. The extended DMVR uses a second sample size for bilateral matching cost calculation, the second sample size is different from the first sample size of the first block. The first sample size is the number of samples in the first block. The second sample size is the number of samples in each of extended reference blocks that are used for the bilateral matching cost calculation in some examples.

At (S1320), a plurality of bilateral matching costs respectively associated with a plurality of motion vector adjustments are calculated. At least a first bilateral matching cost in the plurality of bilateral matching costs is calculated based on the second sample size that is different from the first sample size of the first block. For example, the first bilateral matching cost is calculated as SAD between two extended reference blocks, the two extended reference blocks respectively have the second sample size.

At (S1330), a first refined motion vector for the first block is determined based on the plurality of bilateral matching costs associated with the plurality of motion vector adjustments. For example, a motion vector adjustment with a lowest bilateral matching cost is selected. The first refinement motion vector is calculated as a combination of an initial motion vector (e.g., from a merge list), and the selected motion vector adjustment.

At (S1340), the first block having the first sample size is reconstructed based on the first refined motion vector. For example, the first block is predicted based on one or more reference blocks indicated by the first refined motion vector. The one or more reference blocks have the same number of samples as the first block.

According to an aspect of the disclosure, the first sample size is larger than the second sample size. For example, when the first sample size is larger than a threshold, smaller sample size can be used in the bilateral matching cost calculation to reduce computation complexity.

According to another aspect of the disclosure, the first block is a subblock in a larger block and the first sample size is smaller than the second sample size. For example, when the first block is a subblock, and then larger sample size can be used in the bilateral matching cost calculation to increase cost calculation accuracy.

In some examples, the first block has a first width of N luma samples and a first height of M luma samples, the first sample size corresponds to a number of luma samples in the first block, the second sample size corresponds to a number of luma samples in a second block with a second width and a second height, the second width is larger than the first width by 2×S1 luma samples, and the second height is larger than the first height by 2×S2 luma samples, and N, M, S1 and S2 are positive integers.

In some examples, the first block has a first width of N luma samples and a first height of M luma samples, the first sample size corresponds to a number of luma samples in the first block, the second sample size corresponds to a number of luma samples in a second block with a second width and a second height, the second width is multiple times of the first width, and the second height is multiple times of the first height.

In some examples, to calculate the plurality of bilateral matching costs respectively associated with the plurality of motion vector adjustments, an extended DMVR block with a center aligned with the first block is determined. The extended DMVR block has the second sample size. According to a first motion vector adjustment and corresponding to the extended DMVR block, a first extended DMVR reference block in a first reference picture and a second extended DMVR reference block in a second reference picture are determined. The first extended DMVR reference block and the second extended DMVR reference block have the second sample size. The first bilateral matching cost, such as SAD, between the first extended DMVR reference block and the second extended DMVR reference block is calculated.

In some examples, to calculate the plurality of bilateral matching costs respectively associated with the plurality of motion vector adjustments, according to a first motion vector adjustment and corresponding to the first block, a first DMVR reference block in a first reference picture and a second DMVR reference block in a second reference picture are determined. The first DMVR reference block and the second DMVR reference block have the first sample size. Then, a first extended DMVR reference block with a center aligned with the first DMVR reference block is determined, the first extended DMVR reference block has the second sample size. Further, a second extended DMVR reference block with a center aligned with the second DMVR reference block is determined. The second extended DMVR reference block has the second sample size. The first bilateral matching cost, such as SAD, between the first extended DMVR reference block and the second extended DMVR reference block is calculated.

According to an aspect of the disclosure, overlapped DMVR process may be applied. In some examples, a second refined motion vector for a second block is determined by an application of the DMVR on the second block. The second block and the first block have an overlapped area. The overlapped area is reconstructed based on the first refined motion vector and the second refined motion vector.

It is noted that a position difference of the first block and the second block is in at least one of a horizontal direction and/or a vertical direction. In an example, the first block and the second block have position difference (e.g., position shift) in the horizontal direction, and overlap horizontally. In another example, the first block and the second block have position difference (e.g., position shift) in vertical direction, and overlap vertically. In another example, the first block and the second block have position difference (e.g., position shift) in both horizontal direction and vertical direction, and overlap horizontally and vertically.

To reconstruct the overlapped area, in some examples, from the first refined motion vector and the second refined motion vector, a refined motion vector associated with a lower bilateral matching cost is selected. The overlapped area is reconstructed according to the refined motion vector.

To reconstruct the overlapped area, in some examples, an average motion vector of the first refined motion vector and the second refined motion vector is calculated. The overlapped area is reconstructed according to the average motion vector.

To reconstruct the overlapped area, in some examples, a weighted average motion vector of the first refined motion vector and the second refined motion vector is calculated. A weight for a refined motion vector is proportional to an inverse of a bilateral matching cost of the refined motion vector. The overlapped area is reconstructed according to the weighted average motion vector.

To reconstruct the overlapped area, in some examples, a first prediction sample for a sample in the overlapped area is generated based on the first refined motion vector, and a second prediction sample for the sample in the overlapped area is generated based on the second refined motion vector. A weighted average of the first prediction sample and the second prediction sample is calculated as a reconstructed sample for the sample in the overlapped area.

In some examples, a syntax element of at least one of a sequence level, a picture level, a slice level, a tile group level and a tile level is encoded into a coded video bitstream, the syntax element has a value that indicates which reconstruction method to use for the overlapped area.

Then, the process proceeds to (S1399) and terminates.

The process (1300) can be suitably adapted. Step(s) in the process (1300) can be modified and/or omitted. Additional step(s) can be added. Any suitable order of implementation can be used.

The techniques described above, can be implemented as computer software using computer-readable instructions and physically stored in one or more computer-readable media. For example, FIG. 14 shows a computer system (1400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
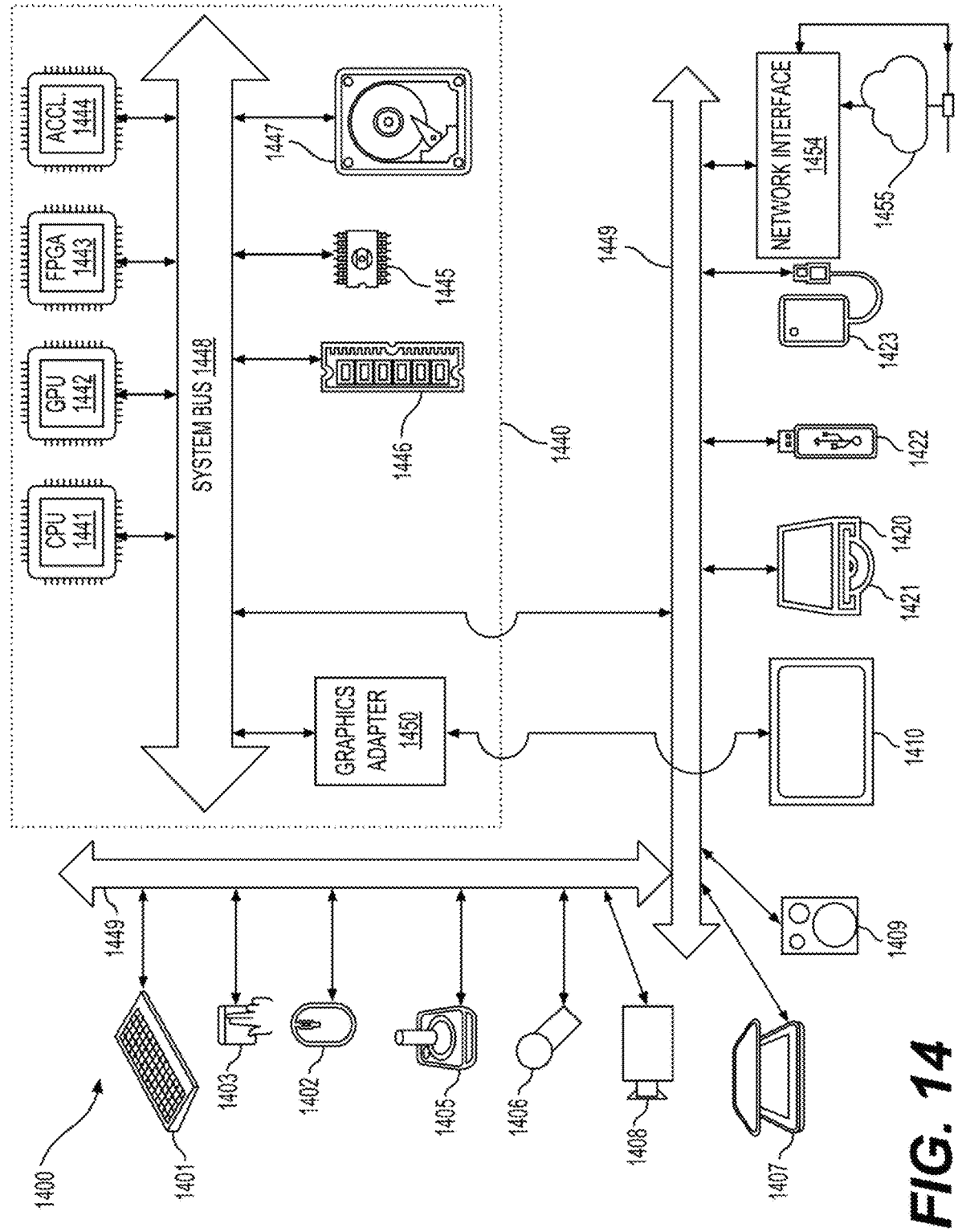
FIG. 14 is a schematic illustration of a computer system in accordance with an embodiment.

The components shown in FIG. 14 for computer system (1400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1400).

Computer system (1400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1401), mouse (1402), trackpad (1403), touch screen (1410), data-glove (not shown), joystick (1405), microphone (1406), scanner (1407), camera (1408).

Computer system (1400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1410), data-glove (not shown), or joystick (1405), but there can also be tactile feedback devices that do not serve as input devices), audio output devices (such as: speakers (1409), headphones (not depicted)), visual output devices (such as screens (1410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1400) can also include human accessible storage devices and their associated media such as optical media including CD/DVD ROM/RW (1420) with CD/DVD or the like media (1421), thumb-drive (1422), removable hard drive or solid state drive (1423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1400) can also include an interface (1454) to one or more communication networks (1455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1449) (such as, for example USB ports of the computer system (1400)); others are commonly integrated into the core of the computer system (1400) by attachment to a system bus as described below (for example Ethernet interface into a PC computer system or cellular network interface into a smartphone computer system). Using any of these networks, computer system (1400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1440) of the computer system (1400).

The core (1440) can include one or more Central Processing Units (CPU) (1441), Graphics Processing Units (GPU) (1442), specialized programmable processing units in the form of Field Programmable Gate Areas (FPGA) (1443), hardware accelerators for certain tasks (1444), graphics adapters (1450), and so forth. These devices, along with Read-only memory (ROM) (1445), Random-access memory (1446), internal mass storage such as internal non-user accessible hard drives, SSDs, and the like (1447), may be connected through a system bus (1448). In some computer systems, the system bus (1448) can be accessible in the form of one or more physical plugs to enable extensions by additional CPUs, GPU, and the like. The peripheral devices can be attached either directly to the core's system bus (1448), or through a peripheral bus (1449). In an example, the screen (1410) can be connected to the graphics adapter (1450). Architectures for a peripheral bus include PCI, USB, and the like.

CPUs (1441), GPUs (1442), FPGAs (1443), and accelerators (1444) can execute certain instructions that, in combination, can make up the aforementioned computer code. That computer code can be stored in ROM (1445) or RAM (1446). Transitional data can be also be stored in RAM (1446), whereas permanent data can be stored for example, in the internal mass storage (1447). Fast storage and retrieve to any of the memory devices can be enabled through the use of cache memory, that can be closely associated with one or more CPU (1441), GPU (1442), mass storage (1447), ROM (1445), RAM (1446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1400), and specifically the core (1440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1440) that are of non-transitory nature, such as core-internal mass storage (1447) or ROM (1445). The software implementing various embodiments of the present disclosure can be stored in such devices and executed by core (1440). A computer-readable medium can include one or more memory devices or chips, according to particular needs. The software can cause the core (1440) and specifically the processors therein (including CPU, GPU, FPGA, and the like) to execute particular processes or particular parts of particular processes described herein, including defining data structures stored in RAM (1446) and modifying such data structures according to the processes defined by the software. In addition or as an alternative, the computer system can provide functionality as a result of logic hardwired or otherwise embodied in a circuit (for example: accelerator (1444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving a coded video bitstream comprising coded information of a first block, the coded information indicating decoder side motion refinement (DMVR) is to be used on the first block, the first block having a first sample size;
applying an extended DMVR on the first block, the extended DMVR using a second sample size for calculating bilateral matching cost between a first extended DMVR reference block using the second sample size and a second extended DMVR reference block using the second sample size, the second sample size being different from the first sample size of the first block;
calculating a plurality of bilateral matching costs respectively associated with a plurality of motion vector adjustments, at least a first bilateral matching cost in the plurality of bilateral matching costs being calculated based on the second sample size that is different from the first sample size of the first block;
determining a first refined motion vector for the first block based on the plurality of bilateral matching costs associated with the plurality of motion vector adjustments; and
reconstructing the first block having the first sample size based on the first refined motion vector.

2. The method of claim 1, wherein the first sample size is larger than the second sample size.

3. The method of claim 1, wherein the first block is a subblock in a larger block and the first sample size is smaller than the second sample size.

4. The method of claim 3, wherein the first block has a first width of N luma samples and a first height of M luma samples, the first sample size corresponds to a number of samples in the first block, the second sample size corresponds to a number of samples in a second block with a second width and a second height, the second width is larger than the first width by 2×S1 luma samples, and the second height is larger than the first height by 2×S2 luma samples, and N, M, S1 and S2 are positive integers.

5. The method of claim 3, wherein the first block has a first width of N luma samples and a first height of M luma samples, the first sample size corresponds to a number of samples in the first block, the second sample size corresponds to a number of samples in a second block with a second width and a second height, the second width is multiple times of the first width, and the second height is multiple times of the first height.

6. The method of claim 3, wherein the calculating the plurality of bilateral matching costs respectively associated with the plurality of motion vector adjustments further comprises:
 determining, an extended DMVR block with a center aligned with the first block, the extended DMVR block having the second sample size;
 determining, according to a first motion vector adjustment and corresponding to the extended DMVR block, the first extended DMVR reference block in a first reference picture and the second extended DMVR reference block in a second reference picture, the first extended DMVR reference block and the second extended DMVR reference block having the second sample size; and
 calculating the first bilateral matching cost between the first extended DMVR reference block and the second extended DMVR reference block.

7. The method of claim 3, wherein the calculating the plurality of bilateral matching costs respectively associated with the plurality of motion vector adjustments further comprises:
 determining, according to a first motion vector adjustment and corresponding to the first block, a first DMVR reference block in a first reference picture and a second DMVR reference block in a second reference picture, the first DMVR reference block and the second DMVR reference block having the first sample size;
 determining, the first extended DMVR reference block with a center aligned with the first DMVR reference block, the first extended DMVR reference block having the second sample size;
 determining, the second extended DMVR reference block with a center aligned with the second DMVR reference block, the second extended DMVR reference block having the second sample size; and
 calculating the first bilateral matching cost between the first extended DMVR reference block and the second extended DMVR reference block.

8. The method of claim 1, wherein the applying the extended DMVR on the first block further comprises:
 applying the extended DMVR when the first sample size is smaller than a threshold.

9. The method of claim 1, further comprising:
 determining that a boundary of the first block is at a boundary of a higher level processing unit; and
 constraining the boundary from extension for additional samples.

10. The method of claim 1, further comprising:
 determining a second refined motion vector for a second block by an application of the DMVR on the second block, the second block and the first block having an overlapped area; and
 reconstructing the overlapped area based on the first refined motion vector and the second refined motion vector.

11. The method of claim 10, wherein a position difference of the first block and the second block is in at least one of a horizontal direction and/or a vertical direction.

12. The method of claim 10, wherein the reconstructing the overlapped area further comprises:
 selecting, from the first refined motion vector and the second refined motion vector, a refined motion vector associated with a lower bilateral matching cost; and
 reconstructing the overlapped area according to the refined motion vector.

13. The method of claim 10, wherein the reconstructing the overlapped area further comprises:
 calculating an average motion vector of the first refined motion vector and the second refined motion vector; and
 reconstructing the overlapped area according to the average motion vector.

14. The method of claim 10, wherein the reconstructing the overlapped area further comprises:
 calculating a weighted average motion vector of the first refined motion vector and the second refined motion vector, a weight for a refined motion vector being proportional to an inverse of a bilateral matching cost of the refined motion vector; and
 reconstructing the overlapped area according to the weighted average motion vector.

15. The method of claim 10, wherein the reconstructing the overlapped area further comprises:
 generating a first prediction sample for a sample in the overlapped area based on the first refined motion vector;
 generating a second prediction sample for the sample in the overlapped area based on the second refined motion vector; and
 calculating a weighted average of the first prediction sample and the second prediction sample as a reconstructed sample for the sample in the overlapped area.

16. The method of claim 10, further comprising:
 decoding a syntax element of at least one of a sequence level, a picture level, a slice level, a tile group level and a tile level, the syntax element having a value indicating a reconstruction of the overlapped area based on the first refined motion vector and the second refined motion vector.

17. A method of video encoding, comprising:
 determining decoder side motion refinement (DMVR) is to be used on a first block, the first block having a first sample size;
 applying an extended DMVR on the first block, the extended DMVR using a second sample size for calculating bilateral matching cost between a first extended DMVR reference block using the second sample size and a second extended DMVR reference block using the second sample size, the second sample size being different from the first sample size of the first block;
 calculating a plurality of bilateral matching costs respectively associated with a plurality of motion vector adjustments, at least a first bilateral matching cost in the plurality of bilateral matching costs being calculated based on the second sample size that is different from the first sample size of the first block;

determining a first refined motion vector for the first block based on the plurality of bilateral matching costs associated with the plurality of motion vector adjustments; and encoding, in a video bitstream, the first block having the first sample size based on the first refined motion vector.

18. The method of claim 17, wherein the first sample size is larger than the second sample size.

19. The method of claim 17, wherein the first block is a subblock in a larger block and the first sample size is smaller than the second sample size.

20. A non-transitory computer-readable storage medium storing instructions which when executed by a processor cause the processor to perform an encoding method comprising:

determining decoder side motion refinement (DMVR) is to be used on a first block, the first block having a first sample size;

applying an extended DMVR on the first block, the extended DMVR using a second sample size for calculating bilateral matching cost between a first extended DMVR reference block using the second sample size and a second extended DMVR reference block using the second sample size, the second sample size being different from the first sample size of the first block;

calculating a plurality of bilateral matching costs respectively associated with a plurality of motion vector adjustments, at least a first bilateral matching cost in the plurality of bilateral matching costs being calculated based on the second sample size that is different from the first sample size of the first block;

determining a first refined motion vector for the first block based on the plurality of bilateral matching costs associated with the plurality of motion vector adjustments;

encoding the first block having the first sample size in a video bitstream based on the first refined motion vector; and transmitting the encoded video bitstream.

* * * * *